(12) United States Patent
Willoughby et al.

(10) Patent No.: US 12,355,785 B2
(45) Date of Patent: Jul. 8, 2025

(54) REVEALING RARE AND ANOMALOUS EVENTS IN SYSTEM AUTOMATION LOGS

(71) Applicant: International Business Machines Corporation, Armonk, NY (US)

(72) Inventors: Dave Willoughby, Austin, TX (US); Marco Selig, Leipzig (DE); Pavel Kravetskiy, Grafenau (DE); Juri Dragoun, Öhringen (DE)

(73) Assignee: International Business Machines Corporation, Armonk, NY (US)

(*) Notice: Subject to any disclaimer, the term of this patent is extended or adjusted under 35 U.S.C. 154(b) by 693 days.

(21) Appl. No.: 17/548,636

(22) Filed: Dec. 13, 2021

(65) Prior Publication Data

US 2023/0188549 A1  Jun. 15, 2023

(51) Int. Cl.
| | |
|---|---|
| *H04L 9/40* | (2022.01) |
| *G06F 16/28* | (2019.01) |
| *G06F 21/56* | (2013.01) |
| *G06N 20/00* | (2019.01) |
| *G06N 20/10* | (2019.01) |

(52) U.S. Cl.
CPC ........ *H04L 63/1425* (2013.01); *G06F 16/285* (2019.01); *G06N 20/00* (2019.01); *G06N 20/10* (2019.01); *H04L 63/1416* (2013.01); *G06F 21/56* (2013.01); *G06F 2221/033* (2013.01)

(58) Field of Classification Search
CPC ...... G06F 16/285; G06F 18/254; G06F 17/40; G06F 21/56; G06N 20/00; G06N 20/10; G06N 20/20; G06N 3/08; H04L 63/1416; H04L 63/1425
See application file for complete search history.

(56) References Cited

U.S. PATENT DOCUMENTS

| | | |
|---|---|---|
| 7,269,684 B2 | 9/2007 | Konson et al. |
| 7,529,654 B2 | 5/2009 | Dowedeit et al. |
| (Continued) | | |

FOREIGN PATENT DOCUMENTS

| | | |
|---|---|---|
| CN | 111767957 A | 10/2020 |
| CN | 113282920 A | 8/2021 |
| (Continued) | | |

OTHER PUBLICATIONS

Farzad et al., "Log Message Anomaly Detection and Classication Using Auto-B/LSTM and Auto-GRU," Research Gate, Nov. 2019, arXiv:1911.08744v2 [cs.LG] Apr. 7, 2021, 19 pages.

(Continued)

*Primary Examiner* — Olugbenga O Idowu
(74) *Attorney, Agent, or Firm* — Kimberly Zillig

(57) ABSTRACT

A computer-implemented method, system, and computer program product for classifying a sequence of log entries of a computing system may be provided. The method may include pre-processing the log entries. The method may also include predicting, as a first output of a first trained machine-learning system, a likelihood of a particular next log entry after the window. The method may also include, predicting, as a second output of a second trained machine-learning system, whether the next log entry is unprecedented. The method may also include combining the first output and the second output for determining a classification of the sequence of log entries.

15 Claims, 8 Drawing Sheets

(56) References Cited

U.S. PATENT DOCUMENTS

| | | | |
|---|---|---|---|
| 2001/0018710 | A1 | 8/2001 | Clarke et al. |
| 2019/0228296 | A1 | 7/2019 | Gefen et al. |
| 2019/0362074 | A1 | 11/2019 | Wang et al. |
| 2020/0076842 | A1 | 3/2020 | Zhou et al. |
| 2021/0224676 | A1* | 7/2021 | Arzani ................ G06F 11/3006 |
| 2022/0103418 | A1* | 3/2022 | Acharjee ................ G06N 20/00 |

FOREIGN PATENT DOCUMENTS

| | | |
|---|---|---|
| CN | 113312485 A | 8/2021 |
| CN | 113468035 A | 10/2021 |
| WO | 2019060327 A1 | 3/2019 |

OTHER PUBLICATIONS

Cimino et al., "Tandem LSTM-SVM Approach for Sentiment Analysis," Printed Dec. 6, 2021, 6 pages.

Li, "Automatic Log Analysis using Machine Learning," Awesome Automatic Log Analysis version 2.0, Nov. 2013, 50 pages.

Levy, "A Machine Learning Approach to Log Analytics," Jan. 19, 2017, 12 pages.

Kaur, "Automatic Log Analysis using Deep Learning and AI," Data Science, Aug. 25, 2020, 18 pages.

"A Method and System for Log Parsing with Contextualized Embeddings in Cloud Microservices," IP.Com, An IP.com Prior Art Database Technical Disclosure, IP.com No. IPCOM000265628D, IP.com Electronic Publication Date: Apr. 30, 2021, 5 pages.

\* cited by examiner

```
100
```

| 102 | pre-processing of the log entries, thereby forming a feature vector |

| 104 | predicting a first output using a first trained machine-learning system |

| 106 | predicting a second output using a first trained machine-learning system |

| 108 | combining the first output and the second output for determining a classification of the sequence of log entries of as a combination of the predicted likelihood value for an appearance of a next log entry and the predicted probability value whether the next log entry in the sequence of log entries following the log entries of the window is unprecedented. |

FIG. 1

REVEALING RARE AND ANOMALOUS EVENTS IN SYSTEM AUTOMATION LOGS

BACKGROUND

The invention relates generally to analyzing log entries of a computing system, and more specifically, to a computer-implemented method for classifying a sequence of log entries of a computing system. The invention relates furthermore to an automation manager system for classifying a sequence of log entries of a computing system, and a computer program product.

In conventional systems, the system will generate various records, or logs, indicating various data or events for the system. A log entry may be a single or individual record/entry within the log. To understand and utilize the log data, the log entries may be analyzed to interpret and learn more about the logs. One method of analyzing logs is classification/categorization, which may help detect any anomalies in the log data. Identifying and detecting anomalies may be necessary and/or helpful for fraud, virus, and/or bug detection, any other intrusion detection, data cleansing, etc.

SUMMARY

According to one aspect of the present invention, a computer-implemented method for classifying a sequence of log entries of a computing system may be provided. The method may include pre-processing the log entries. The method may also include predicting, as a first output of a first trained machine-learning system, a likelihood of a particular next log entry after the window. The method may also include, predicting, as a second output of a second trained machine-learning system, whether the next log entry is unprecedented. The method may also include combining the first output and the second output for determining a classification of the sequence of log entries.

According to another aspect of the present invention, an automation manager system for classifying a sequence of log entries of a computing system is provided. The system may comprise a processor and a memory, communicatively coupled to the processor, wherein the memory stores program code portions that, when executed, enable the processor to pre-process the log entries. The processor may also be enabled to predict, as a first output of a first trained machine-learning system, a likelihood of a particular next log entry after the window. The processor may also be enabled to predict, as a second output of a second trained machine-learning system, whether the next log entry is unprecedented. The processor may also be enabled to combine the first output and the second output for determining a classification of the sequence of log entries.

Furthermore, embodiments may take the form of a computer program product that includes a computer readable storage medium having program instructions embodied therewith, the program instructions executable by a server to cause the server to perform a method. The method may include pre-processing the log entries. The method may also include predicting, as a first output of a first trained machine-learning system, a likelihood of a particular next log entry after the window. The method may also include, predicting, as a second output of a second trained machine-learning system, whether the next log entry is unprecedented. The method may also include combining the first output and the second output for determining a classification of the sequence of log entries.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 1 depicts a block diagram of an embodiment of the inventive computer-implemented method for classifying a sequence of log entries of a computing system, according to some embodiments.

Figure 2:
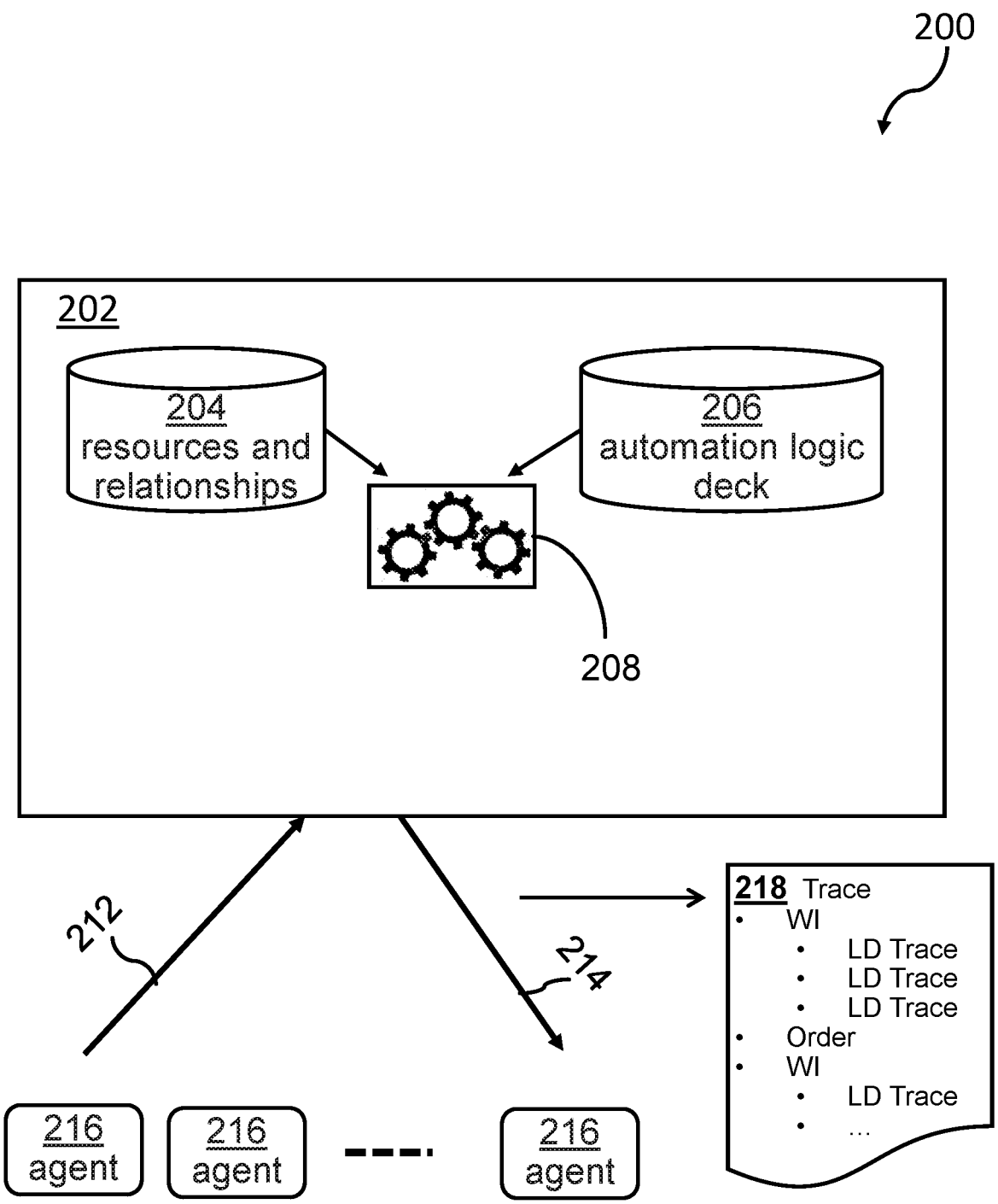
FIG. 2 depicts an overview of how the automation manager interacts with components in its environment, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In the context of this description, the following conventions, terms and/or expressions may be used:

The term 'classifying a sequence of log entries' may denote categorizing a consecutive group of log entries into at least three groups, namely "normal," "rare," "anomalous."

The term 'a computing system' may denote any computing system of a group of computing systems. The proposed concept may in particular be of interest for mainframe computer systems—e.g., z-architecture based computing complexes—or large cloud computing environments comprising a large plurality of central and peripheral subsystems.

The term 'feature vector' may denote a vector in the form of numbers or words or phrases as its elements, which represents a sequence of log entries of a system automation tool. Such log entries protocol incoming status messages about resources from the central or peripheral components or resources (e.g., services or applications) of the computing system. Thereby, a resource may basically be anything about which data may be collected.

The term 'window of a predetermined size' may denote a predefined number of log entries.

The term 'log entry' may denote an automatically generated message about a resource of a computing system under surveillance or system automation control.

The term 'machine-learning system' (ML system) may denote a system that uses data to be trained in order to develop a machine-learning model. Based on this machine-learning model predictions may be generated even for unseen input. Hence, a machine-learning system may not be seen as a procedural system for which each determination may be predefined because of a predefined procedural step. Instead, the behavior of the machine-learning system may depend on the training, in particular, on the training data.

The term 'machine-learning model' may denote and represent the behavior of the machine-learning system after it may have been trained. Basically, the machine-learning model comprises parameter values of nodes and edges—e.g., weight values and transformation coefficients—in case the machine-learning system is a neural network. However, the concept proposed here is not be limited to neural networks. Also other types of machine-learning systems may be used.

The term 'likelihood value' may denote a normalized probability value for a prediction of the machine-learning system. As an example in the context of the here proposed concept: if 11 log entries are available and the first 10 of them (i.e., the windows size) are used as input for the machine-learning system, then the machine-learning system may predict a probability for the 11th measured log entry. The 11th measured log entry, or any log entry/entries that are next after the window, may be referred to as the next log entry or next log entries.

The term 'unprecedented' may denote that a term—in particular, a log entry or a sequence thereof—may not have been seen before in a certain context, i.e., it may be completely unexpected.

The term 'long short-term memory' (LSTM) may denote the known long short-term memory architecture of the artificial recovery neural network (RNN) architecture. Unlike standard feedforward neural networks, LSTM uses feedback connections. Thereby, it is enabled to not only process single data points but also entire sequences of data, such as sequences of log entries.

The term '1-class support vector machine' (1C-SVM) may denote a support vector machine which only operates using one class. The support vector machine has to be trained like any other machine-learning system in order to classify incoming data—in particular, a sequence of log entries—having this certain characteristic, like "rare" or "unprecedented."

Managing large and complex computing environments remains a major challenge for enterprise computing groups, as well as for service providers. Complexity may be inherent in interdependent computing systems because not only do in-house installations become more and more complex driven by requirements for supporting different hardware architectures, heterogeneous network environments, virtualization—including network and storage network virtualization—but also by the need for integrating cloud computing services from third-party organizations in order to form hybrid cloud computing environments.

In information technology (IT) environments, in which setting up a new virtual system is only a question of minutes—or sometimes only seconds—system automation with a lot of autonomy for these systems is instrumental. However, it becomes also more and more difficult to use a complete hierarchical approach to systems management. Too many dependencies exist so that all future statuses of the complex computing environment cannot be foreseen. However, automatic responses from system automation managers may be generated in order to respond in an automatic way to typical incidents in the computing environment. On the other side, there are real and anomalous events that may happen for which traditional system automation tools or automation managers may not have an appropriate response pattern. Frequent errors and properly handled events are of less interest in this case. Users find infrequent, mishandled events a lot more interesting. The following example describes such a situation:

For example, a forced application shutdown is seldom performed and is therefore a rare event by definition. If a senior operator encounters block evidence of such a rare event and finds additional procedural errors, he may suspect that one of the novice operators—i.e., a less skilled person—attempted this manually. Digging deeper, the senior operator realizes that this was done by an automation task that a novice operator just (re-)coded incorrectly. So, this bug "may therefore hide" in the system for month until the unlikely trigger of a forced shutdown leads to the execution of this automation task. Now, the senior operator faces the unlikely event and potentially extraordinary side effects. A variant of this example could be a rare event that deletes its own of entries in the event of an automation error. This appears to the senior operator as if a user were exploiting a security vulnerability hole, and gaining too much authority, and then, e.g., deleting the audit log entry in order to hide the source of this action. Colloquially expressed, the system automation tool "lies" (e.g., unconsciously) and afterwards protects itself by deleting the traces.

Hence, there is a need for complex computing environments and system automation to detect and also differentiate between rare and anomalous events.

The proposed computer-implemented method for classifying a sequence of log entries of a computing system may offer multiple advantages, technical effects, contributions and/or improvements:

The proposed system and method may address several beneficial aspects of system automation at the same time. Firstly, an automated log entry analysis can be made easily for a continuous monitoring and/or target investigation. Thereby, secondly, an analysis of a sequence window of events becomes advantageously possible with the capability to detect unprecedented, missing, and/or disordered events or sequences of events. It has proven that this can be very advantageous for system operators in analyzing wrong or misguided automatic responses from system automation tools. This can be achieved by a transparent labeling and finally also by visual highlighting of relevant event types: "normal," "rare," and "anomalous." Hereby, one of the advantageous effects is that the proposed concept may be enabled to differentiate between rare and anomalous logged events.

As a result, IT (information technology) system operators may be enabled to identify errors in systems management procedures and scripts more easily and faster and thus, enable a higher availability for applications which are important for supporting technical/production/IoT (Internet of Things) and business processes.

Furthermore, and in contrast to known concepts, the method and system is not limited to outliers of the end of a time series but may analyze a sequence of (m+n) log entries regardless of particular time series to clearly and reliably differentiate (i) a likelihood of an appearance of one or more "next" log entries—i.e., n log entries—and (ii) a potential errors character—or in general unexpected sequence—of the current log entries in the window.

Therefore—and also in contrast to known technologies—the proposed concept may detect missing series of events—i.e., log entries—at any place in a sequence of log entries.

Using the two ML concept—i.e., LSTM and SVM— in parallel to classify log entries it become advantageously possible to not only differentiate between likely and unlikely log entries (i.e., events) but also to split the unlikely events into ordinary and extraordinary events to reduce false-positive alarms. Thereby the extraordinary events may represent the true anomalies. This may also help the operator to find missing previous events in the sequence of log entries, seeing the most likely events based on the LSTM prediction as potential missing candidates.

Furthermore, an additional alerting concept or also automated corrective actions may be enabled with the concept proposed here. They may further reduce the workload for the experienced operator.

In the following, additional embodiments of the inventive concept—applicable for the method as well as for the system—will be described.

According to an advantageous embodiment of the method, the first machine learning model may use a long short-term memory—i.e., LSTM—architecture. The LSTM architecture may be especially useful to process a sequence of data points—i.e., the elements of the feature vector derived from the log entries instead of processing only single data points. The LSTM architecture is also known for its good anomaly detection capabilities.

According to another advantageous embodiment of the method, the second machine-learning model may be a 1-class support vector—i.e., 1C-VSM—machine-learning architecture. This machine-learning architecture may be especially useful for a classification or regression analysis. This may be useful in this case because the task of the 1C-VSM may be in predicting whether a log event—i.e., the event after the window of log events or the last entry in the window—is unprecedented or not.

According to an enhanced embodiment of the method, the first machine-learning model and the second machine-learning model may be trained in parallel. This may help to save training time and may support the usage of identical feature vectors for the first and the second machine-learning model.

According to a useful embodiment of the method, the log entries for forming the feature vector are anomaly-free log data. These may be manually cleaned up log entry sequences or those coming out of a regression test. Cleaning up data, otherwise referred to as data cleaning or data cleansing, may be the process of removing and/or resolving anomalies in the log data. This may include removing corrupt data, correcting improperly formatted data, fixing incorrect data, etc. The cleaning up and/or other methods of making the log data anomaly-free may be done in a product test suite in which a set of test cases may be executed in the development lab to validate the product quality. Such a service automation test suite may comprise functions such as function verification tests, feature tests, etc. allowing to test most of the service automation functions and design usage scenarios. It may be also an advantage for the inventive concept that no customer data are needed to train the underlying model; instead, lab internal tests may be used for the initial training. However, every new gathered log entry may be used to improve the model.

According to a preferred embodiment of the method, the combining the first output and the second output enables a classification of any entry in a log sequence as normal, rare or anomalous. With this, an important goal of the underlying problem may be advantageously solved: not only identifying rare events but also those that are anomalous. A clear differentiation between these two terms is given in the context of table 1 and table 2 below.

According to a further developed embodiment, the method may also comprise triggering a preventive recovery action for a resource upon detecting an anomalous log sequence entry. Such an anomalous entry may be an unexpected shutdown of an application. In such a case, the automation manager may simply restart the application in order to reduce the downtime for users to a minimum. Other reactions to other log entries messages are possible.

According to an additionally interesting embodiment of the method, the sequence of log entries may originate from a z/OS supported computing system. It is known that such computing systems may become pretty complex—particularly, in light of all the potential peripheral devices. Hence, the method and system proposed here may unfold its full potential for z-architecture systems. Further, the concept may also be very useful for large cloud computing data centers with a large plurality of identical devices, e.g., processing systems, virtual systems, and storage devices. Here, several thousand processing systems and tens of thousands of virtual machines may be implemented at the same time, which makes manual monitoring this army of resources almost impossible. The proposed concept is not limited to z-architecture systems. It may be used in any computing context, including edge devices and IoT networks.

According to another advanced embodiment of the method, the next log entry after the window of the sequence of log entries may be a sequence of log entries. This may allow not only the ability to judge over the next log entry after the end of the window of the sequence of log entries, but also one or more additional logged events after the end of the window. This may represent an additional and broader scope of the proposed concept.

According to a permissive embodiment of the method, the feature vector may comprise message identifiers of the log entries. This may be the simplest form of a log event and may be difficult to read for a human operator. In a clearly defined environment such as the z-systems, the message identifiers of the log events are also well structured and clear, and they have proven to be sufficient for a successful implementation of the concept proposed here. For more sophisticated implementations, also additional words of the human readable portion of the logged event string may be converted into elements of the feature vector. This may allow an even better prediction of rare and anomalous events.

According to another further developed embodiment, the method may also comprise skipping—i.e., ignoring—one or more log entries—i.e., at least one log entry—unrelated to one or more previous log entries in the window of the sequence of log entries. This may allow weeding out those event log messages that are unrelated to any resource in the watch. It may help to not mix up unrelated components in the serialized log stream in order to reduce false positives alarms.

In the following, a detailed description of the figures will be given. All instructions in the figures are schematic. Firstly, a block diagram of an embodiment of the inventive computer-implemented method for classifying a sequence of log entries of a computing system is given. Afterwards, further embodiments, as well as embodiments of the automation manager system for classifying a sequence of log entries of a computing system will be described.

FIG. 1 shows a block diagram of a preferred embodiment of the computer-implemented method 100 for classifying a sequence of log entries of a computing system. The method 100 includes pre-processing, 102, of the log entries, thereby forming a feature vector covering a window—in particular, a moving window—of a predetermined size of the sequence of log entries, and predicting, 104, a first output using a first trained machine-learning system. The first machine-learning system may have been trained using a plurality—in particular, a first plurality—of feature vectors (e.g., of anomaly-free log data) as input training data. This may result in a first machine-learning model for predicting a likelihood value—i.e., a probability value—for an appearance of a next log entry after the window of the sequence of log entries as first output. Thereby, the prediction may not be limited to only the next log entry after the end of the window but also to a plurality of additional log sequence entries.

The method 100 may additionally comprise predicting, 106, a second output using a second trained machine-learning system. The second system may have been trained using a plurality—in particular a second plurality—of the formed feature vectors as input training data, resulting in a second machine-learning model for predicting a probability value whether the next log entry in the sequence of log entries following the log entries of the window is unprecedented as second output. Method 100 further includes combining, 108, the first output and the second output for determining a classification of the sequence of log entries as a combination of the predicted likelihood value for an appearance of a next log entry and the predicted probability value whether the next log entry in the sequence of log entries following the log entries of the window is unprecedented. This represents finally closing the loop for classifying a sequence of log entries of a computing system.

FIG. 2 shows an overview 200 of how the automation manager 202 interacts with the components in its environment. On one side, the automation manager 202 comprises storage 204 (long-term manager) for data about known resources and relationships among them. For the decision component—in particular the automation logic 208—of the automation manager 202, data about the resources as well as the models and available logic are stored here. The resource information relates, for example, to applications running on agent systems and their interrelated dependencies, for instance, in the form of start/stop/recovery dependencies and prerequisites.

The automation manager 202 also includes storage for logic deck information 206. The logic deck information 206 may be formulated in a descriptive language defining the automation logic. The execution of a logic deck—e.g., a script—generates messages for each evaluation stage, known as LD (logic deck) trace.

The agents 216 relate to the resources and collect data about its functionality in the form of work items 212 which are sent to the automation manager 202. These work items 212 are evaluated, 210, by the automation logic 208 and orders 214 are generated and sent to at least one of the agents 216. Thereby, the work item 212 denotes any request from the automation agent 202 like status changes, requests, queries, and so on. In contrast, the orders 214 describe actions to be executed on the automation agent 216, e.g., for one or more of the resources. As a resulting effect, a trace 218 can be generated.

For illustrative purposes, an example of an entry—i.e., an event—and the sequence of log events is shown:
"HSAL6269I status/automation is idle," or
"HSAL6019I resource is not startable."

More complex log events structures with or without identifiers are possible.

In general, the data structure of an entry in the log file comprises a timestamp, a header, a message ID (or message identifiers) a message body, related identified resources, as well as related variables. It should also be clear that a cyclic evaluation of resource variables causes a variable change which, as a consequence, causes a re-evaluation of the resource tree. Thereby, huge amounts of data are generated comprising repeating sequences of log entries. For a human operator it is very difficult to find errors and thousand lines of traces between a problem source and a visible impact.

Figure 3:
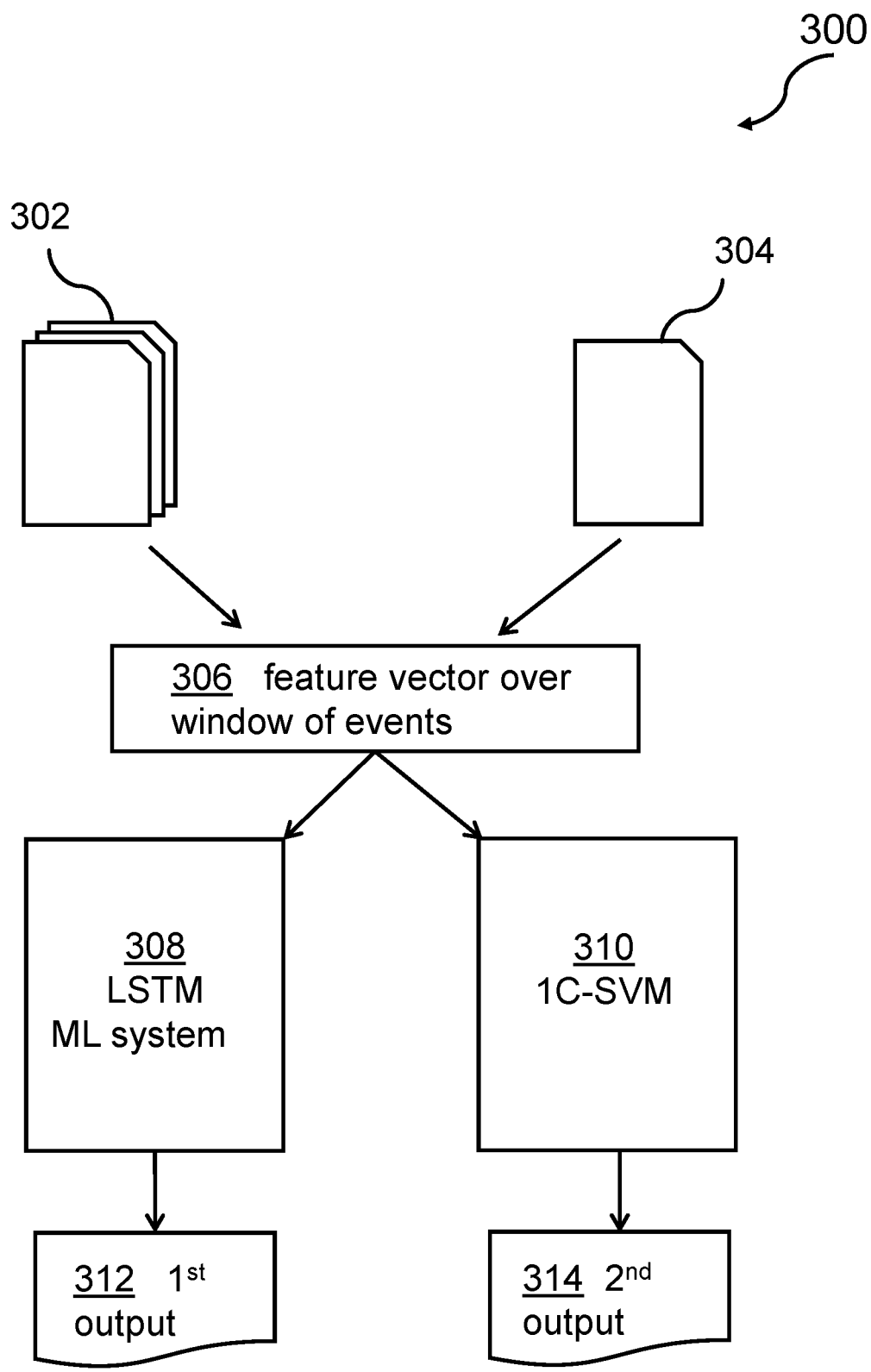
FIG. 3 depicts an overview of components for classifying a sequence of log entries of a computer system, according to some embodiments.

FIG. 3 shows an overview 300 over components being involved in the concept proposed here. During a training session, anomaly-free log data 302 (e.g., from a regression test) are used. Along a sequence of such anomaly-free log data 302, representing events in the computing environment, a window is selected and the feature vector 306 which is generated after some preprocessing over the events in the window is set to two machine-learning systems. During the training, the first machine-learning system 308—in particular an LSTM machine-learning system 308—is trained to predict a pseudo-probability for any possible next message, entry or entries in the log sequence. This may help predict the next entry/entries and their likeliness. The pseudo-probability for any possible next message, entry or entries may then compared against the real data in the log sequence. The output of the LSTM machine-learning system 308 is shown as first output 312 indicating whether the next log entry (or next log entries) is likely or unlikely; and to which degree.

On the other side, the feature vector 306 is fed to a 1-class support vector machine (1C-SVM) machine-learning system 310 in order to output as second output 314, a classification about whether the input—i.e., the next event log entry—is unprecedented. In some instances, an input may be unprecedented when it is deemed extraordinary by the 1C-SVM machine-learning system 310. In some instances, the first output 312 differentiates between likely or unlikely (for instance, as it is from the LSTM machine-learning system 308) whereas the second output 314 differentiates between ordinary or extraordinary (for instance, as it is from the 1C-SVM machine-learning system 310). Through combining these two outputs it becomes possible to differentiate "normal" events, "rare" events and "anomalous" events.

In order to develop a better understanding for these three different cases, the following table of sample events in automation may be considered:

TABLE 1

| | error character "ordinary" | error character: extraordinary |
|---|---|---|
| appearance: likely | an operator uses automation to start an application: | like events appear frequently and are by definition not extraordinary |

TABLE 1-continued

| | error character "ordinary" | error character: extraordinary |
|---|---|---|
| | "start" request<br>"starting" request<br>"available" status | |
| appearance:<br>unlikely | an operator uses automation to start a broken application:<br>"start" request<br>"starting" status<br>"abandoned" status<br>"restart" status | an operator uses automation to stop an application, but another automation or human attempts to re-start it:<br>"start" request<br>"stopping" status<br>"stopped" status<br>"available" status |

The different work items (FIG. 2, 212) and orders (FIG. 2, 214) appear now in a logical and easy to grasp context.

Thereby, it is assumed that an event in the log sequence (i.e., sequence of log records) is reflected by a single of a sequential series or log messages that, if anomalous, require immediate attention. Three types of events in such logs that are differentiated are of special interest. They are differentiated by the typical likelihood of appearance and character in terms of indicating a potential error in the system.

Identifying such events enables an automated labeling as well as a visual highlighting that helps users/operators in their search for irregularities and potential errors.

The following table shows this differentiation:

TABLE 2

| | error character "ordinary" | error character: extraordinary |
|---|---|---|
| appearance:<br>likely | "normal" event<br>(e.g., start and stop of an application) | like events appear frequently and are by definition not extraordinary |
| appearance:<br>unlikely | "rare" event<br>(e.g., emerging shot-down) | "anomalous" event<br>(e.g., stop before start of an application) |

Finally, it should be mentioned that only focusing on the probability for possible next entries using the LSTM machine-learning system 308 would only allow differentiating between likely and unlikely events. In addition, such a trained model would only yield random results for unprecedented sequences, which were not part of the training set. Hence, using only the LSTM machine-learning system 308 would only be a very simplistic solution. For a full functioning system to detect rare and anomalous events, the second machine-learning portion—i.e., the 1-class support vector machine 310—may be used in order to execute the prediction for a classification whether a given input is unprecedented.

Furthermore, during a deployment phase—i.e., after training—production system log data 304 are used to build the feature vector 306 to be input to the LSTM machine-learning system 308 as well as the 1-class support vector machine ML system 310 in order to generate the first output 312 and the second output 314 to differentiate between the different classes, as discussed above.

Figure 4:
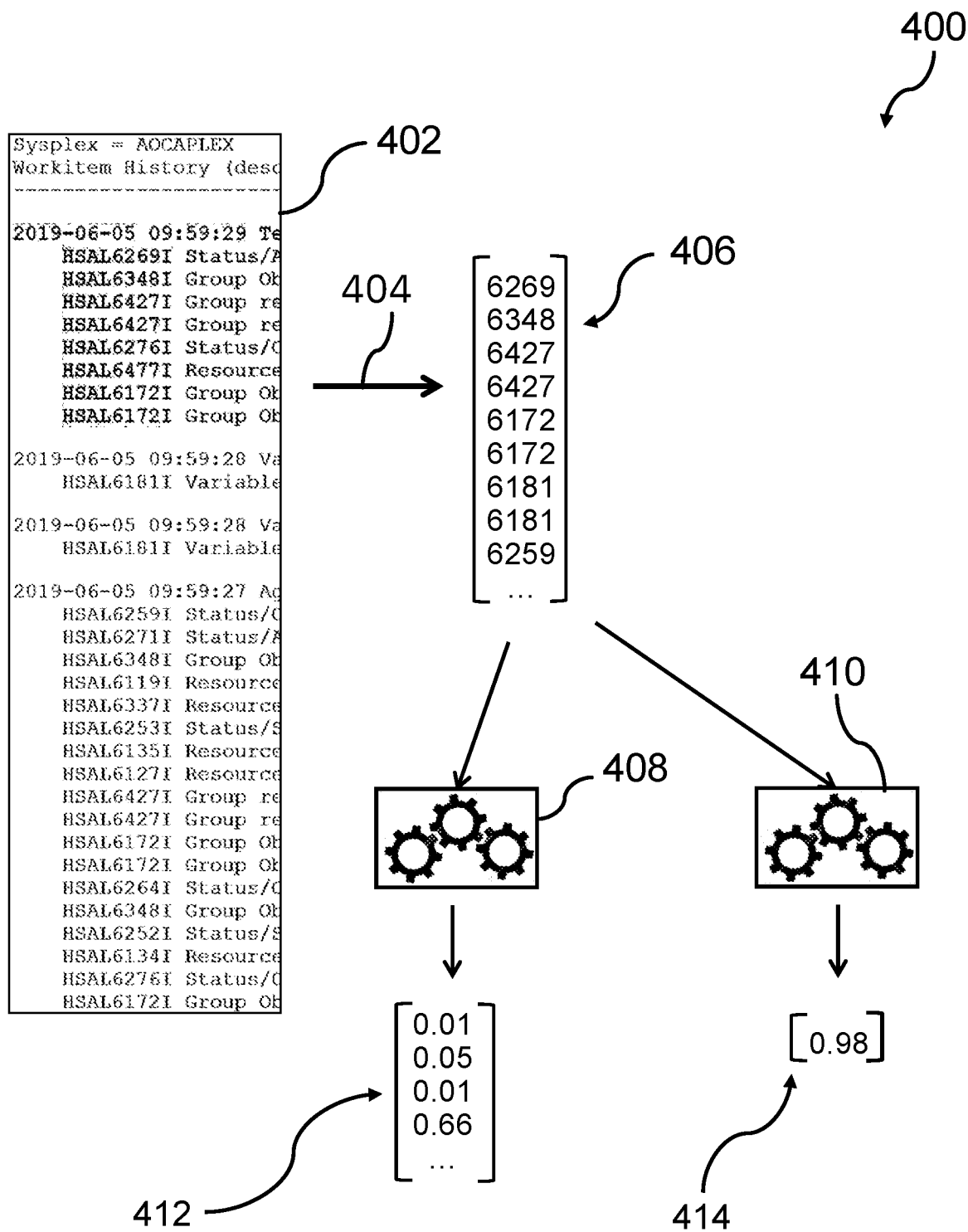
FIG. 4 depicts possible data structures used for classifying a sequence of log entries of a computer system, according to some embodiments.

FIG. 4 shows an embodiment 400 of the data structures used for the proposed concept. Starting from a section or window 402 of raw log data, a feature vector of 406 is built by some pre-processing 404. In an exemplary embodiment, the feature vector only comprises log message identifier numbers. However, the pre-processing 404 may also comprise much more sophisticated methods to extract key terms or key phrases of the log message entry from the logged data 402, e.g., based on NLP (natural language processing). As discussed herein, in certain environments it may be sufficient to extract only the log message identifiers. The feature vector 406 is then passed to the LSTM machine 408 to produce the first output for a (pseudo-) probability 412 for a next possible entry in the log entry sequence. Instead of predicting the probability only for a next entry, other probability values may be determined or predicted for a sequence of next entries. Thereby, the value 0.01 may represent that the chance that the message HSAL0001I as the next message is 1%. The value 0.05 may represent that the chance that the message HSAL0002I is the next message is 5%, and so on.

On the other side, the feature vector 406 is also passed to the 1C-SVM machine 410. The 1C-SVM 410 is optimized—i.e., trained—to predict a classification whether the entry after the window of the sequence of log entries is unprecedented or not, 414. The shown value of 0.98 indicates that the input sequence that has been seen is similar because the output value is very close to "1." In case the second output would be close to zero, the input sequence would be classified as rare or unprecedented, i.e., novel or unseen before with a high probability.

Figure 5:
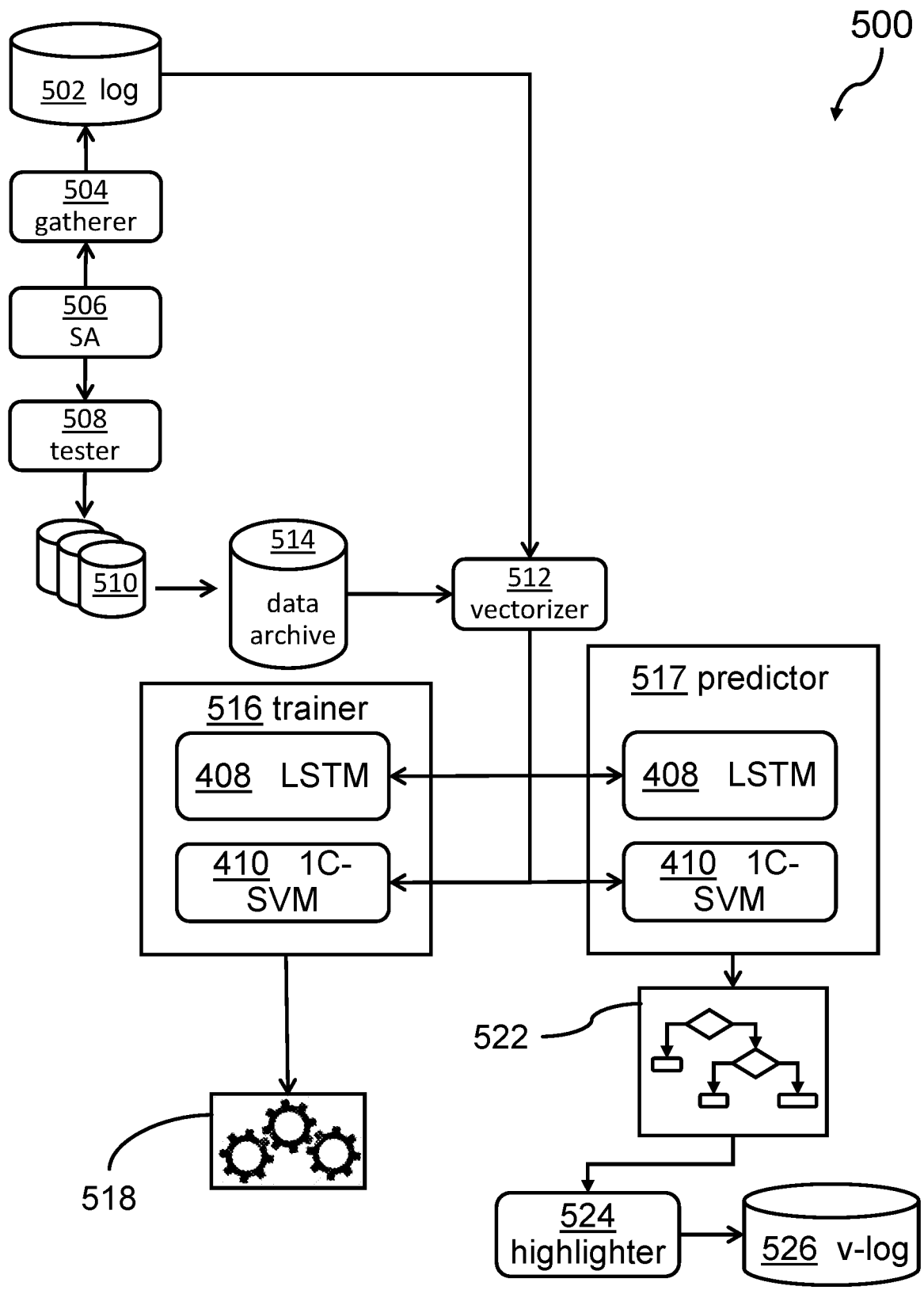
FIG. 5 depicts an example architecture for classifying a sequence of log entries of a computer system, according to some embodiments.

FIG. 5 shows an embodiment of the architecture 500 of the inventive concept. The data gatherer 504 is designed to collect the incoming log event messages from a system automation tool 506 to generate the log sequence 502. The system automation tool 506 (i.e., the component producing the logs, for example FIG. 2, 202) delivers the log entries either to the data gatherer 504 or to a tester 508 during product testing. Here, the log entries may be cleaned up and stored—e.g. in the form of a plurality of log entries—in the archive 514. The archive 514 may also be filled with entries out of a regression test.

From the log sequence 502 as well as the logs 510, a vectorizer 512 generates the feature vectors which will forward it to the first machine-learning system LSTM 408 as well as to the second machine-learning system 1C-SVM 410 which can be part of a training environment or trainer 516. The resulting machine-learning models 518 may be stored to be used during the deployment of prediction phase.

Alternatively, the feature vector may be input to the trained first and second machine-learning system 408, 410 as part of the predictor 517—in particular, during the implementation phase of prediction phase—and the output may be fed to the classifier 522. The result of the classifier 522 (see below for more details) can highlight—in particular using the highlighter 524—certain log entries of the visualized log entries 526 using a specific color code for anomalous entries (e.g., "red;" e.g., stop after start of a resource; error message), for normal entries (e.g., "green") and for rare events (e.g., "yellow;" e.g., cannot re-start).

Figure 6:
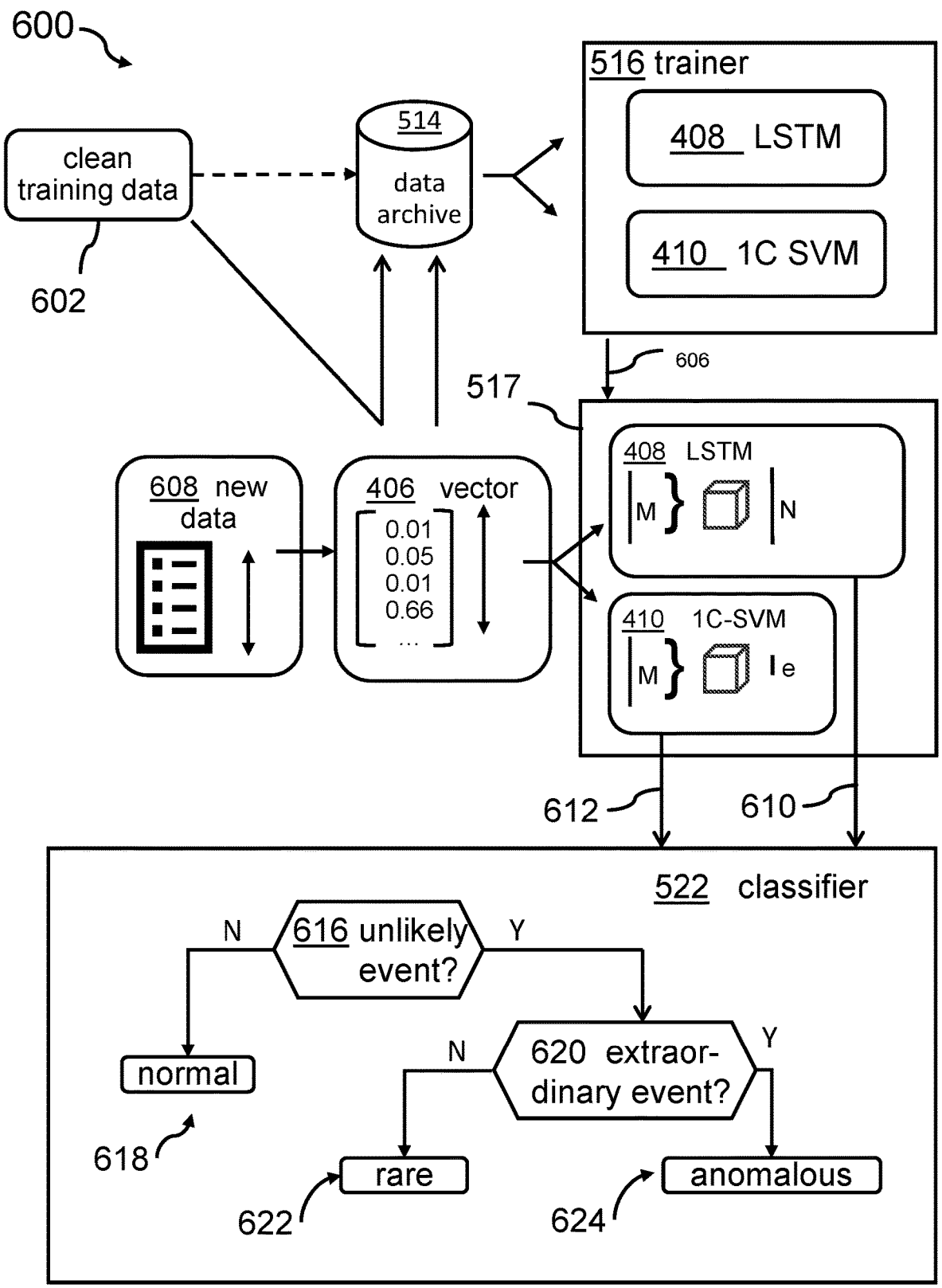
FIG. 6 depicts a data flow supporting the components for classifying a sequence of log entries of a computer system, according to some embodiments.

FIG. 6 illustrates the data flow 600 supporting the components of the proposed concept. Initially, the system is trained. For this, clean log entry data 602 are used to train the first ML (machine-learning) system 408 and the second ML system 410, the clean log entry data 602 are preprocessed, and a feature vector 406 is built. All data may be stored in the data archive 514. From here, the training data is passed to the trainer 516 with its subcomponents LSTM 408 (as an example for the first ML system) and a 1-class SVM 410 (as an example for the second ML system). Once the two ML systems are trained, they are deployed 606 into the prediction phase (in predictor 517).

Here, real-life log sequence entries in the form of new data 608 are fed to the system. There may be m current log entries covered by a window and n next log entries following the window. Hence, the new data comprises at least m+n lines of log entries. From this, a feature vector 406 is built. It comprises M+N=(n+m)*f entries, wherein the value of "f" represents the number of features per log entry. As already described above, the feature vector of the new data 608 is passed to the first ML system 408 and the second ML system 410, within predictor 517, which predict the first output 610 and the second output 612.

The first output 610 represents the likelihood or probability for N "next" log entries, whereas the second output 612 represents a potential error value, representing, for example, the unprecedentedness of the sequence of log entries within the window.

The first output 610 and the second output 612 are then combined in the classifier 522. It should be mentioned that the classifier 522 is not to be understood as ML-based system but as procedural logic. Firstly, it is determined 616 whether the next log event (for example, the first output 610) is an unlikely event. If that is not the case, the log entry represents a normal event 618. In case of an unlikely event during the determination 616—case "Y"—, a second determination 620 is performed to decide whether the event is extraordinary. If that is not the case—case "N"—the event is classified as a "rare" event 622. If it is decided that an extraordinary event is present during the determination 620—case "Y"—the event is classified as "anomalous" event 624. This way, normal, rare, and anomalous events can be differentiated in an advantageous form.

As an example for a simple case, it may be assumed that m=10 which are "current events" and n=1 which is seen as the "next" event. Consequently there are 11 total log entries to be taken into account. If the number of features is 1 (i.e., f=1) 11-dimensions of feature vectors are built. An example f=1 would be to use the identifier of the event log entry only. In this scenario, the first ML system 408 predicts the 11th entry and the second ML system 410 characterizes or predicts an error character of the "current" 10 entries. This way, the 11th log entry can be classified as "normal," "rare," or, "anomalous."

Figure 7:
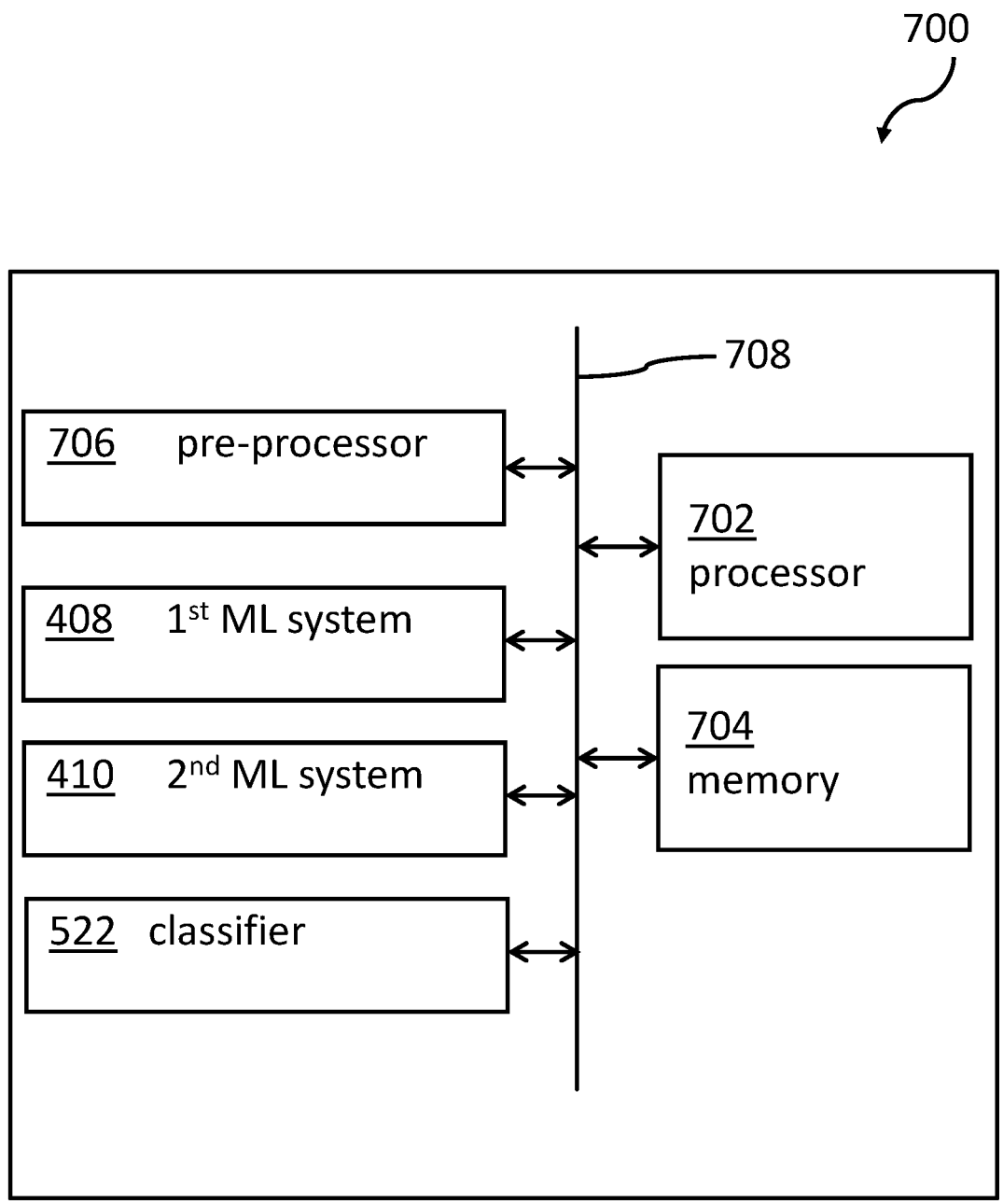
FIG. 7 depicts a block diagram of the automation manager system for classifying a sequence of log entries of a computing system, according to some embodiments.

FIG. 7 shows a block diagram of the automation manager system 700 for classifying a sequence of log entries of a computing system. The system 700 comprises a processor 702 and a memory 704, communicatively coupled to the processor 702, wherein the memory 704 stores program code portions that, when executed, enable the processor 702, to pre-process—in particular, by a pre-processor 706—the log entries, thereby forming a feature vector covering a window of a predetermined size of the sequence of log entries.

The processor 702 may also be enabled to predict a first output using a first trained machine-learning system 408, wherein the first machine-learning system 408 has been trained using a plurality of feature vectors as input training data resulting in a first machine-learning model for predicting a likelihood value for an appearance of a next log entry after the window of the sequence of log entries as first output, and to predict a second output using a second trained machine-learning system 410, wherein the second system 410 has been trained using a plurality of the formed feature vectors as input training data resulting in a second ML model for predicting a probability value whether the next log entry in the sequence of log entries following the log entries of the window is unprecedented as second output.

The processor 702 is also enabled to combine—in particular, by the classifier 522—the first output and the second output. The classifier 522 may determine a classification of the sequence of log entries of a combination of the predicted likelihood value for an appearance of a next log entry and the predicted probability value whether the next log entry in the sequence of log entries following the log entries of the window is unprecedented.

It shall also be mentioned that all functional units, modules, and functional blocks may be communicatively coupled to one another for signal or message exchange in a selected 1:1 manner. Alternatively the functional units, modules and functional blocks—in particular, the processor 702, the memory 704, the preprocessors 706, the first ML system 408, the second ML system 410, and the classifier 522—can be linked to a system internal bus system 708 for a selective signal or message exchange.

Figure 8:
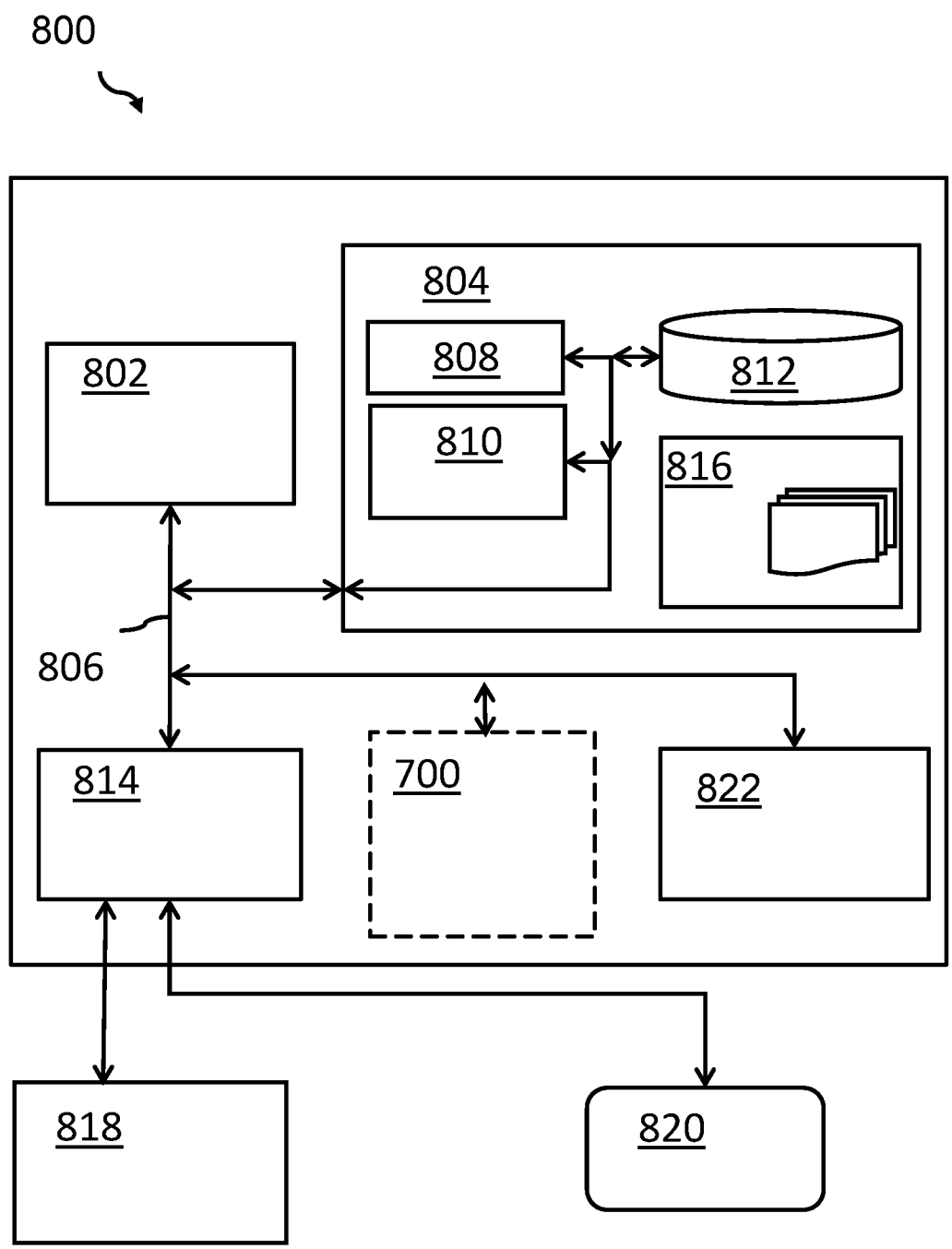
FIG. 8 depicts an example computing system that includes the automation manager system, according to some embodiments.

Embodiments of the invention may be implemented together with virtually any type of computer, regardless of the platform being suitable for storing and/or executing program code. FIG. 8 shows, as an example, a computing system 800 suitable for executing program code related to the proposed method.

The computing system 800 is only one example of a suitable computer system, and is not intended to suggest any limitation as to the scope of use or functionality of embodiments of the invention described herein, regardless, whether the computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/ server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the invention, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of the computer system/server 800 via bus 806. It should be understood that, although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, the automation manager system 700 for classifying a sequence of log entries of a computing system may be attached to the bus system 806.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for classifying a sequence of log entries of a computing system, the method comprising:
   pre-processing the log entries;
   forming a plurality of feature vectors from the log entries that are anomaly-free log data;
   training a first machine-learning system using the plurality of feature vectors as input training data resulting in a first machine learning model for predicting a likelihood value for an appearance of a next log entry after a window of the sequence of log entries;
   training a second machine-learning system using the plurality of feature vectors as input training data resulting in a second machine learning model for predicting a probability value of whether the next log entry after the window of the sequence of log entries is unprecedented, wherein the first machine-learning model and the second machine-learning model are trained in parallel;
   predicting, as a first output of the first trained machine-learning system, a likelihood of a particular next log entry after the window;
   predicting, as a second output of the second trained machine-learning system, whether the next log entry is unprecedented; and
   combining the first output and the second output for determining a classification of the sequence of log entries.

2. The method according to claim 1, wherein the first machine learning model uses a long short-term memory architecture.

3. The method according to claim 1, wherein the second machine learning model uses a 1-class support vector machine-learning architecture.

4. The method according to claim 1, further comprising:
   in response to combining the first output and the second output, classifying an entry in a log sequence as normal, rare, or anomalous.

5. The method according to claim 1, further comprising:
   triggering a preventive recovery action for a resource upon detecting an anomalous log sequence entry.

6. The method according to claim 1, wherein the next log entry after the window of the sequence of log entries is a sequence of log entries.

7. The method according to claim 1, wherein the classification of the sequence of log entries is a combination of a predicted likelihood value for an appearance of the next log entry and a predicted probability value of whether the next log entry is unprecedented.

8. The method according to claim 1, further comprising:
   skipping a log entry unrelated to one or more previous log entries in the window of the sequence of log entries.

9. An automation manager system for classifying a sequence of log entries of a computing system, the system comprising:
a processor and a memory, communicatively coupled to the processor, wherein the memory stores program code portions that, when executed, further configure the processor, to:
pre-process the log entries;
forming a plurality of feature vectors from the log entries that are anomaly-free log data;
train a first machine-learning system using the plurality of feature vectors as input training data resulting in a first machine learning model for predicting a likelihood value for an appearance of a next log entry after a window of the sequence of log entries;
train a second machine-learning system using the plurality of feature vectors as input training data resulting in a second machine learning model for predicting a probability value of whether the next log entry after the window of the sequence of log entries is unprecedented, wherein the first machine-learning model and the second machine-learning model are trained in parallel;
predict, as a first output of the first trained machine-learning system, a likelihood of a particular next log entry after the window;
predict, as a second output of the second trained machine-learning system, whether the next log entry is unprecedented; and
combine the first output and the second output for determining a classification of the sequence of log entries.

10. The automation manager system according to claim 9, wherein the first machine learning model is a long short-term memory machine-learning system.

11. The automation manager system according to claim 9, wherein the second machine learning model is a 1-class support vector machine-learning system.

12. The automation manager system according to claim 9, wherein the processor is also configured to:
in response to combining the first output and the second output, classifying an entry in a log sequence as normal, rare, or anomalous.

13. The automation manager system according to claim 9, wherein the processor is also configured to:
trigger a preventive recovery action for a resource upon detecting an anomalous log sequence entry.

14. The automation manager system according to claim 9, wherein the processor is also configured to:
skip a log entry unrelated to one or more previous log entries in the window of the sequence of log entries.

15. A computer program product for classifying a sequence of log entries of a computing system, the computer program product comprising a computer readable storage medium having program instructions embodied therewith, the program instructions executable by a server to cause the server to perform a method, the method comprising:
pre-processing the log entries;
forming a plurality of feature vectors from the log entries that are anomaly-free log data;
training a first machine-learning system using the plurality of feature vectors as input training data resulting in a first machine learning model for predicting a likelihood value for an appearance of a next log entry after a window of the sequence of log entries;
training a second machine-learning system using the plurality of feature vectors as input training data resulting in a second machine learning model for predicting a probability value of whether the next log entry after the window of the sequence of log entries is unprecedented, wherein the first machine-learning model and the second machine-learning model are trained in parallel;
predicting, as a first output of the first trained machine-learning system, a likelihood of a particular next log entry after the window;
predicting, as a second output of the second trained machine-learning system, whether the next log entry is unprecedented; and
combining the first output and the second output for determining a classification of the sequence of log entries.

* * * * *